United States Patent [19]

Chamberlain, IV

[11] Patent Number: 5,736,722
[45] Date of Patent: Apr. 7, 1998

[54] DUAL SENSOR DECODER

[75] Inventor: Frederick Rockwell Chamberlain, IV, Vista, Calif.

[73] Assignee: Eastman Kodak Company, Rochester, N.Y.

[21] Appl. No.: 598,780

[22] Filed: Feb. 8, 1996

[51] Int. Cl.$^6$ .................................................. G06K 7/08
[52] U.S. Cl. .......................... 235/449; 235/462; 235/493
[58] Field of Search ................................ 235/375, 462, 235/472, 449, 493

[56]  References Cited

U.S. PATENT DOCUMENTS

| 3,663,803 | 5/1972 | Mohan et al. | 235/375 |
|---|---|---|---|
| 4,647,766 | 3/1987 | Dimur et al. | 235/472 |
| 5,054,092 | 10/1991 | LaCaze | 382/11 |
| 5,096,038 | 3/1992 | Potter et al. | 194/210 |
| 5,122,645 | 6/1992 | Saeki et al. | 235/462 |
| 5,268,562 | 12/1993 | Lazardis | 235/462 |

FOREIGN PATENT DOCUMENTS 2 042 979   10/1980   United Kingdom .

*Primary Examiner*—Harold Pitts
*Attorney, Agent, or Firm*—William F. Noval

[57]  ABSTRACT

A medium having an information pattern encoded as changes in two values of a medium characteristic, including start and end key patterns which have characteristic value changes spaced a fixed distance apart, and including intermediate characteristic value changes, which, with the key patterns, encode information.

Two sensors are spaced from each other the fixed distance for sensing the medium characteristic value changes as the medium and the sensors are moved relatively to each other, and for producing signals representative thereof.

Circuitry for processing the signals from the sensors to produce an information signal is provided.

5 Claims, 2 Drawing Sheets

DUAL SENSOR DECODER

FIELD OF INVENTION

This invention relates in general to an information system and more particularly to a system for reading encoded information which is insensitive to velocity variations between the media and information sensor.

BACKGROUND OF THE INVENTION

Conventional systems for reading encoded information stored on a media involve moving the storage media past a single sensor. These systems generally require a relatively constant velocity between the media and sensor, or require some method of measuring the position of the media as it is moved past the sensor in order to successfully decode the information.

Woolley (U.K. Patent 2,042,979) describes a magnetic encoding method in which the magnetic particle orientation is fixed in at least three sets of spaced regions in order to provide a self clocking mechanism with just a single read head.

Potter and Reeves (U.S. Pat. No. 5,096,038) describe a detector which can read a magnetic pattern in a document, in the conventional manner of moving the document past the detector to generate a temporal signal.

LaCaze (U.S. Pat. No. 5,054,092) describes a Magnetic Ink Character Recognition (MICR) system which employs a document speed measurement means to enable the reading of encoded information.

There is thus a problem in the prior art of reading encoded information from media which is insensitive to velocity variation between the media and sensors which read the encoded information.

SUMMARY OF THE INVENTION

According to the present invention there is provided a solution to the problems of the prior art.

It is an object of the present invention to provide a system for reading encoded information in documents and product packaging. The system includes using two sensors positioned at a fixed distance from each other, along the reading direction.

As the encoded media is moved past the two sensors, the order of signal pulses from the two sensors provides a means to decode the information. The order in which the signal pulses are received is completely independent of the media speed and acceleration.

According to a feature of the present invention, there is provided an information system comprising:

a medium having an information pattern encoded as changes in two values of a medium characteristic, including start and end key patterns which have characteristic value changes spaced a fixed distance apart, and including intermediate characteristic value changes which with said key patterns encode information;

two sensors spaced from each other said fixed distance for sensing said medium characteristic value changes as said medium and said sensors are moved relatively to each other, and for producing signals representative thereof; and circuitry for processing said signals from said sensors to produce an information signal.

ADVANTAGEOUS EFFECT OF THE INVENTION

The present invention is completely insensitive to velocity variations. This makes it particularly advantageous for hand held reading devices. The media may be moved with non-constant speed, even to the point of stopping in mid scan, because only the relative order of the pulses from the two sensors matters.

DETAILED DESCRIPTION OF THE INVENTION

The present invention relates in general to the reading of encoded information. The invention is applicable to magnetic media having information encoded as magnetic transitions which are read by magnetic field sensors such as magnetoresistor sensors. The invention is also applicable to magnetic bar codes which may be hidden by lamination or overprinting. The invention is also applicable to visual media having information encoded as visual patterns such as bar codes which are read optically. The invention is also applicable to hybrid systems in which information is encoded both magnetically and optically.

Figure 1:
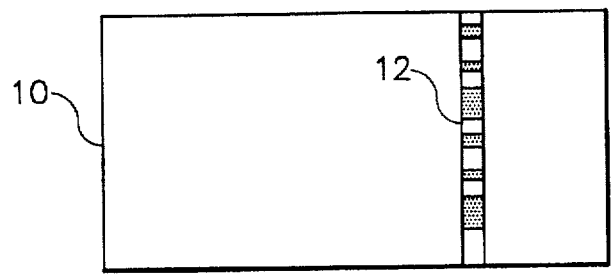
FIG. 1 depicts a document which contains a magnetic bar code.

FIG. 1 depicts document 10 which contains a hidden magnetic bar code 12 which consists of intermittent areas of printed magnetic material, laminated into a security thread.

This item will be used as an example to explain the detailed operation of one embodiment of the invention. It is to be appreciated that this is just one of the myriad of potential embodiments of the invention. The present invention is applicable to any optical or magnetic pattern in a document or product, including but not limited to printed bar codes, printed magnetic ink, paper containing magnetic particles, plastic containing magnetic particles, or conventional magnetic media, i.e., magnetic tape.

Figure 2:
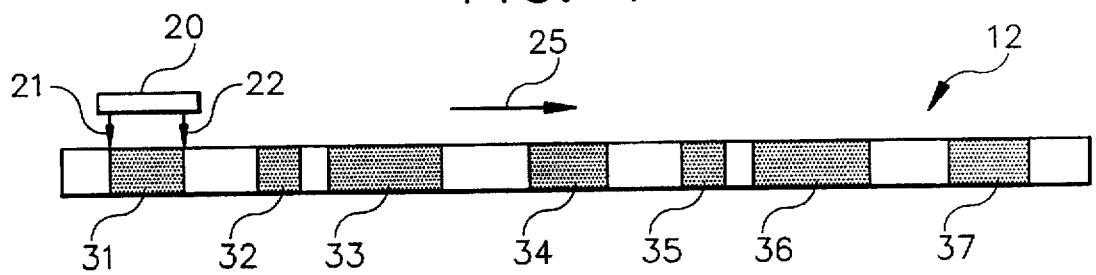
FIG. 2 is a detail view of a magnetic bar code and the dual sensor decoder.

FIG. 2 is a detail view of magnetic bar code 12 with discreet areas of magnetic material 31 through 37, and the dual sensor decoder 20. The bar code of this example is periodic every 3 bars. That is, the pattern of bars 31, 32, and 33 is repeated by bars 34, 35, and 36, and so on. If the bar code start point is randomly located in the document, the bar code sequence length must be slightly less than half the length of the document so that at least two complete bar codes will be present.

The decoder 20 has sensors 21 and 22, which are spaced from each other the same distance as the length of bar 31. In this embodiment of the invention, each different bar code has one and only one bar in it with this length. This "key bar" serves to start and end the reading process.

In this embodiment of the invention, the preferred sensor operates using the magnetoresistive effect, because the signal magnitude is not dependent on the relative velocity between the bar code and the decoder.

To prepare the bar code for decoding, a transient DC magnetic field is applied to the bar code in the direction anti-parallel to arrow 25, forming regions of positive and negative magnetic poles at the leading and trailing edges of each bar 31 through 37.

Figure 3:
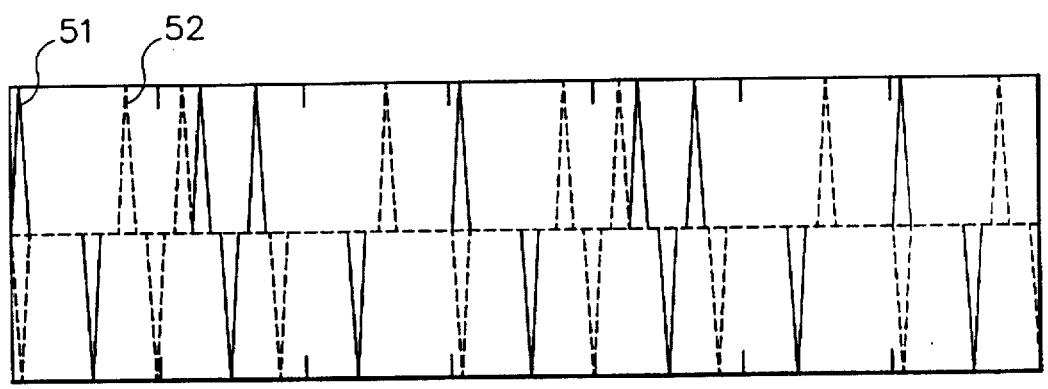
FIG. 3 is a graph of the signals 51 and 52 from the sensors of the decoder.

FIG. 3 is a graph of the signal from each sensor, as a function of the position of decoder 20 as it is moved along bar code 12 in the direction indicated by arrow 25. Signal 51 is from sensor 21, and signal 52 is from sensor 22. The signal waveforms are the same, only displaced by the distance between the sensors. In this example, positive magnetic charge produces a positive pulse, and negative charge a negative pulse.

Figure 4:
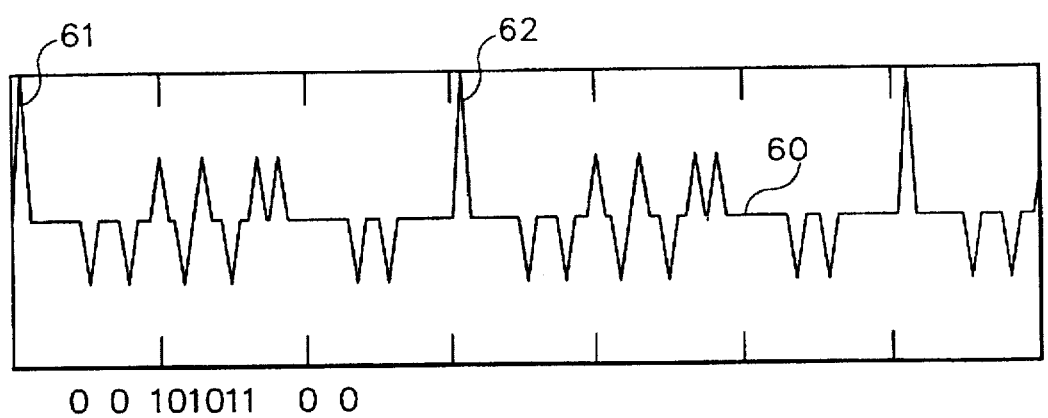
FIG. 4 is a graph of signal 51 minus signal 52.

FIG. 4 is a graph of the output signal 60, which is the difference between signals 51 and 52. When the decoder passes over bar 31, the key bar, a double height output pulse is produced. When a document is decoded, the simultaneous presence of pulses on each channel is used to begin the decoding process. The subsequent pulses are used to form a binary number, shown by the ones and zeros at the bottom of FIG. 4. Pulse 62 is coincident with the end of the reading process. At this point in the scan, the decoding is complete, and the document is identified by the binary number, in this case 0010101100, or 172.

Figure 5:
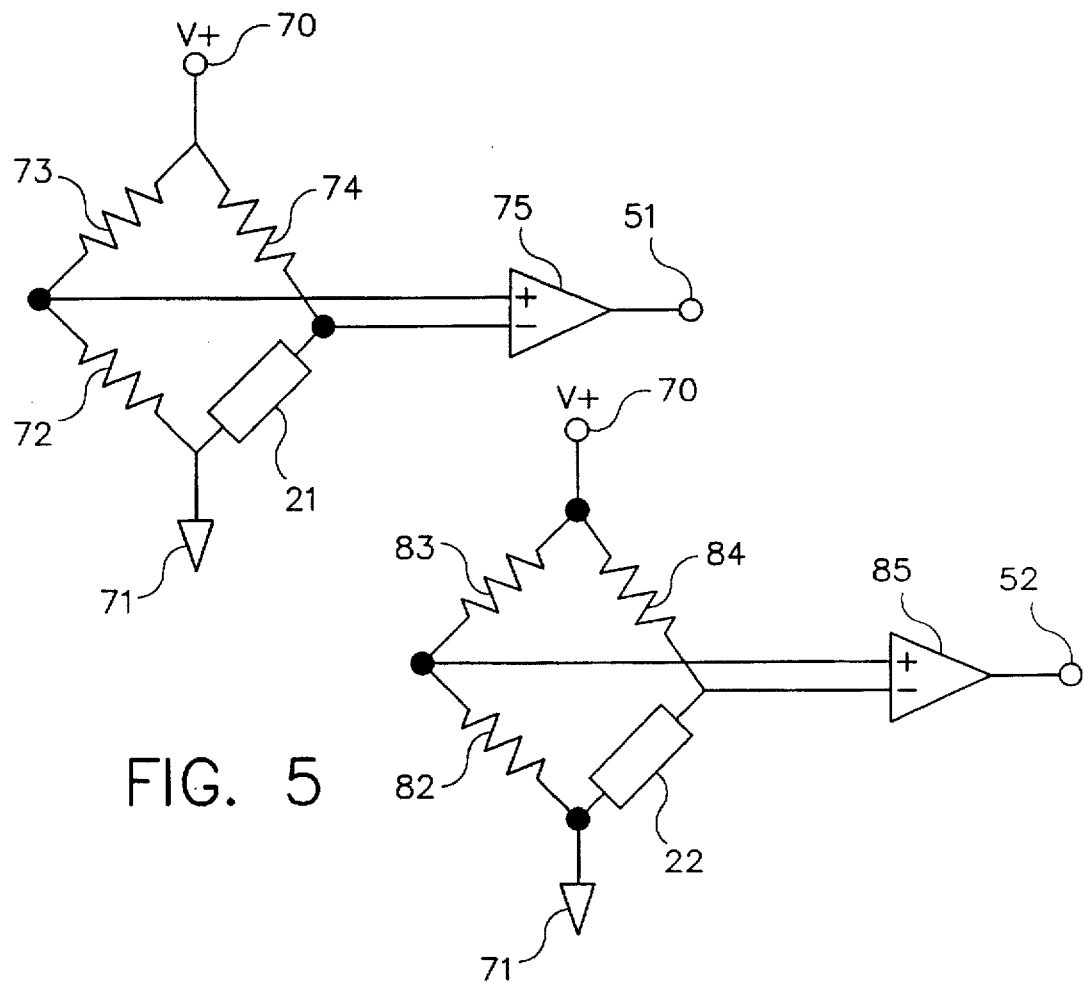
FIGS. 5 and 6 are schematic views of signal processing electrical circuitry.
Figure 6:
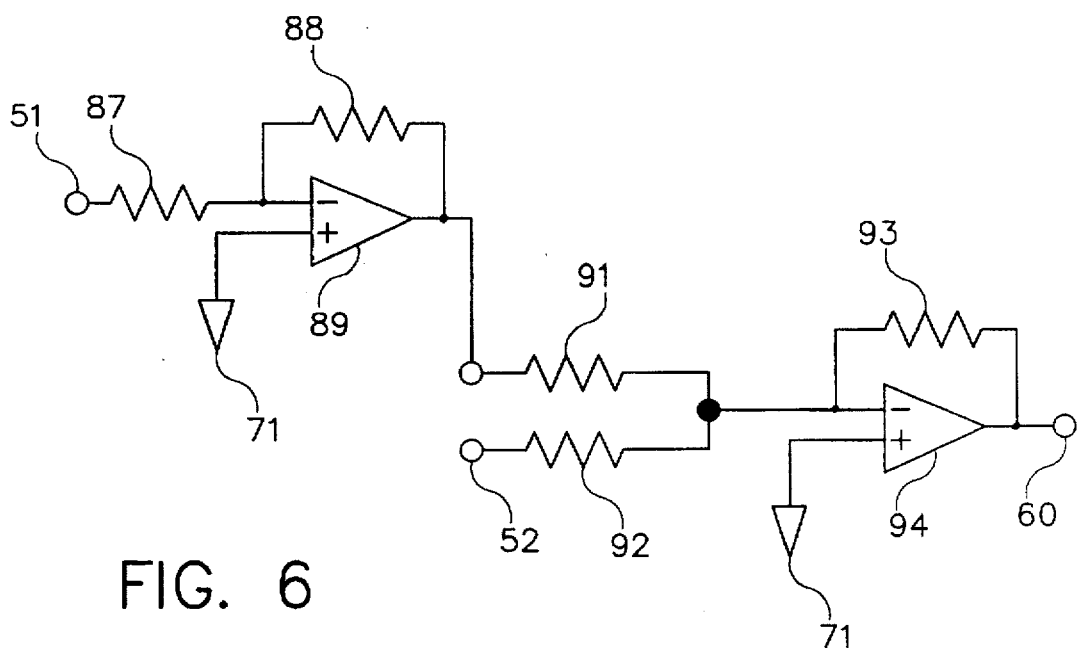

FIGS. 5 and 6 show schematic diagrams of circuitry for processing the signals read by sensors 21 and 22. FIG. 5 shows an amplifier circuit for the decoder in the case where sensors 21 and 22 are magnetoresistors. Sensor 21 is wired in a bridge configuration with resistors 72, 73, 74, which have the same resistance as sensor 21 with no applied magnetic field. The bridge is connected to voltage source 70 and ground 71, and the other two junctions of the bridge are connected to differential amplifier 75 which produces signal 51 as shown in FIG. 3. Similarly, sensor 22 is connected with resistors 82, 83, 84 and differential amplifier 85 to produce signal 52.

FIG. 6 shows a circuit which combines signals 51 and 52 into signal 60, shown in FIG. 4. Signal 51 is inverted by amplifier 89, and then the inverted sum of that signal and signal 52 is produced by amplifier 94. The net output signal 60 is therefore signal 51 minus signal 52.

The invention has been disclosed in detail with respect to preferred embodiments thereof, but it will be understood that variations and modifications can be effected within the spirit and scope of the invention.

What is claimed is:

1. An information system comprising:

a medium having an information pattern encoded as changes in two values of a medium characteristic, including start and end key patterns which have characteristic value changes spaced a fixed distance apart, and including intermediate characteristic value changes spaced apart distances which are greater or less than said fixed distance and spaced apart distances which are greater or less than said fixed distance and which with said key patterns encode information;

two sensors spaced from each other said fixed distance for sensing said medium characteristic value changes as said medium and said sensors are moved relatively to each other, in a direction of movement, said sensors being spaced apart in said direction of movement and for producing signals representative thereof; and circuitry for processing said signals from said sensors to produce an information signal the start and end pattern signals delineating an information block.

2. The system of claim 1 wherein said circuitry uses the relative order of signal pulses from said two sensors to produce said information signal.

3. The system of claim 1 wherein said medium characteristic is a magnetic field, and said two sensors are magnetic field sensors.

4. The system of claim 3 wherein said magnetic field sensors are magnetoresistor sensors.

5. The system of claim 1 wherein said medium characteristic is a visual characteristic and wherein said sensors are optical sensors.

* * * * *